US009709145B2

(12) United States Patent
Depraete et al.

(10) Patent No.: US 9,709,145 B2
(45) Date of Patent: Jul. 18, 2017

(54) TORQUE CONVERTER AND HYDROKINETIC TORQUE COUPLING DEVICE HAVING TURBINE-PISTON LOCKUP CLUTCH, AND RELATED METHODS

(71) Applicant: VALEO EMBRAYAGES, Amiens Cedex (FR)

(72) Inventors: Alexandre Depraete, Bloomfield, MI (US); Sungchul Lee, Troy, MI (US)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/561,961

(22) Filed: Dec. 5, 2014

(65) Prior Publication Data

US 2016/0160971 A1    Jun. 9, 2016

(51) Int. Cl.
*F16H 45/02*    (2006.01)

(52) U.S. Cl.
CPC ..... *F16H 45/02* (2013.01); *F16H 2045/0205* (2013.01); *F16H 2045/0231* (2013.01);
(Continued)

(58) Field of Classification Search
CPC ..... F16D 2045/0278; F16D 2045/0231; F16D 2045/0205; F16D 2045/0263; F16D 2045/0294; F16D 45/02
See application file for complete search history.

(56) References Cited

U.S. PATENT DOCUMENTS

| 2,130,895 A | 9/1938 | Ness |
| 2,860,747 A | 11/1958 | Kelley |

(Continued)

FOREIGN PATENT DOCUMENTS

| DE | 1550957 A1 | 7/1969 |
| DE | 2245901 A1 | 4/1974 |

(Continued)

OTHER PUBLICATIONS

U.S. Appl. No. 14/510,244, filed Oct. 9, 2014, First Named Inventor: Alexandre Depraete.
(Continued)

*Primary Examiner* — Richard Lorence
*Assistant Examiner* — David Morris
(74) *Attorney, Agent, or Firm* — Berenato & White, LLC

(57) ABSTRACT

A hydrokinetic torque coupling device features an impeller including an impeller shell and impeller blades, and a turbine-piston including a turbine-piston shell and turbine blades. The turbine-piston is movable axially toward and away from the impeller shell to position the torque converter (or a hydrokinetic torque coupling device containing the torque converter) into and out of lockup mode. The impeller shell comprises a toroidal impeller shell portion that terminates at a first distal end clutch surface. The turbine-piston shell comprises a toroidal turbine-piston shell portion and a folded-over portion folded over onto the toroidal turbine-piston shell portion so as to engage the toroidal turbine-piston shell portion of the turbine-piston shell. The turbine-piston shell terminates at a second distal end clutch surface defined by the toroidal turbine-piston shell portion and the folded-over portion so that the second distal end clutch surface faces the first distal end clutch surface.

7 Claims, 12 Drawing Sheets

(52) U.S. Cl.
CPC ............... *F16H 2045/0263* (2013.01); *F16H 2045/0278* (2013.01)

(56) References Cited

U.S. PATENT DOCUMENTS

| | | | |
|---|---|---|---|
| 2,992,713 A * | 7/1961 | Stump | F16H 61/14 |
| | | | 192/3.33 |
| 3,041,892 A * | 7/1962 | Schjolin | F16H 45/02 |
| | | | 192/221 |
| 3,252,352 A | 5/1966 | General et al. | |
| 4,041,701 A | 8/1977 | Goto et al. | |
| 5,713,442 A | 2/1998 | Murata et al. | |
| 5,813,505 A * | 9/1998 | Olsen | F16H 45/02 |
| | | | 192/200 |
| 6,026,940 A | 2/2000 | Sudau | |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 8,276,723 B2 | 10/2012 | Verhoog et al. | |
| 8,479,901 B2 | 7/2013 | Engelmann | |
| 9,303,700 B2 * | 4/2016 | Lindemann | F16H 41/24 |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2006/0086584 A1 | 4/2006 | Maucher et al. | |
| 2009/0020385 A1 | 1/2009 | Nakamura | |
| 2010/0236228 A1 | 9/2010 | Degler | |
| 2012/0241273 A1 | 9/2012 | Kawahara | |
| 2013/0230385 A1 | 9/2013 | Lindemann et al. | |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |
| 2015/0027110 A1 * | 1/2015 | Lindemann | F16H 41/24 |
| | | | 60/338 |
| 2015/0362041 A1 | 12/2015 | Lee et al. | |
| 2016/0123402 A1 * | 5/2016 | Avins | F16F 15/1232 |
| | | | 60/338 |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2706967 A1 | 12/1994 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.
U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,333, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.
Lindemann et al., "iTC—Innovative Solutions for Torque Converters Pave the Way into the Future", Torque Converter 20, pp. 280-301 , date unknown.
Machine Translation of EP 0125428 downloaded from EPO.org on Jul. 22, 2016.

* cited by examiner

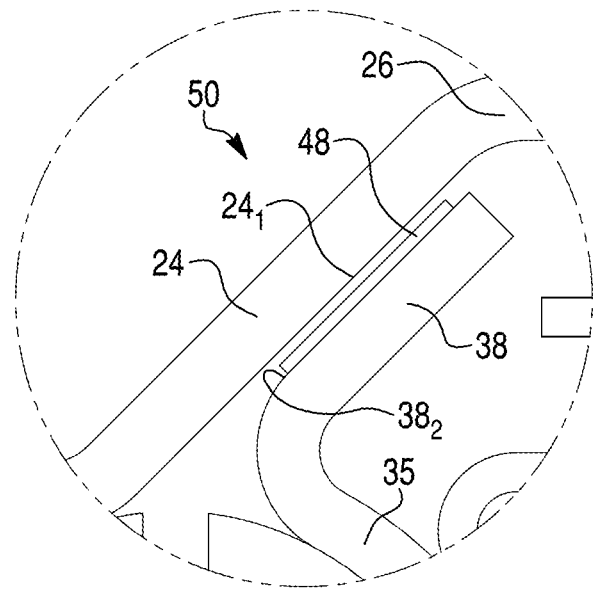
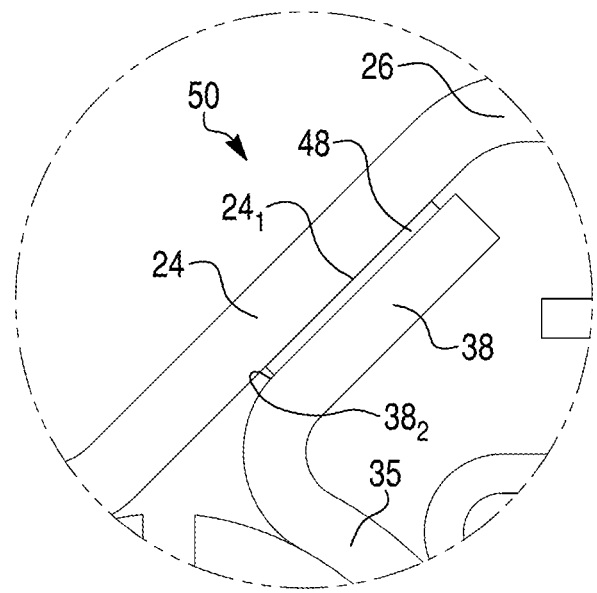

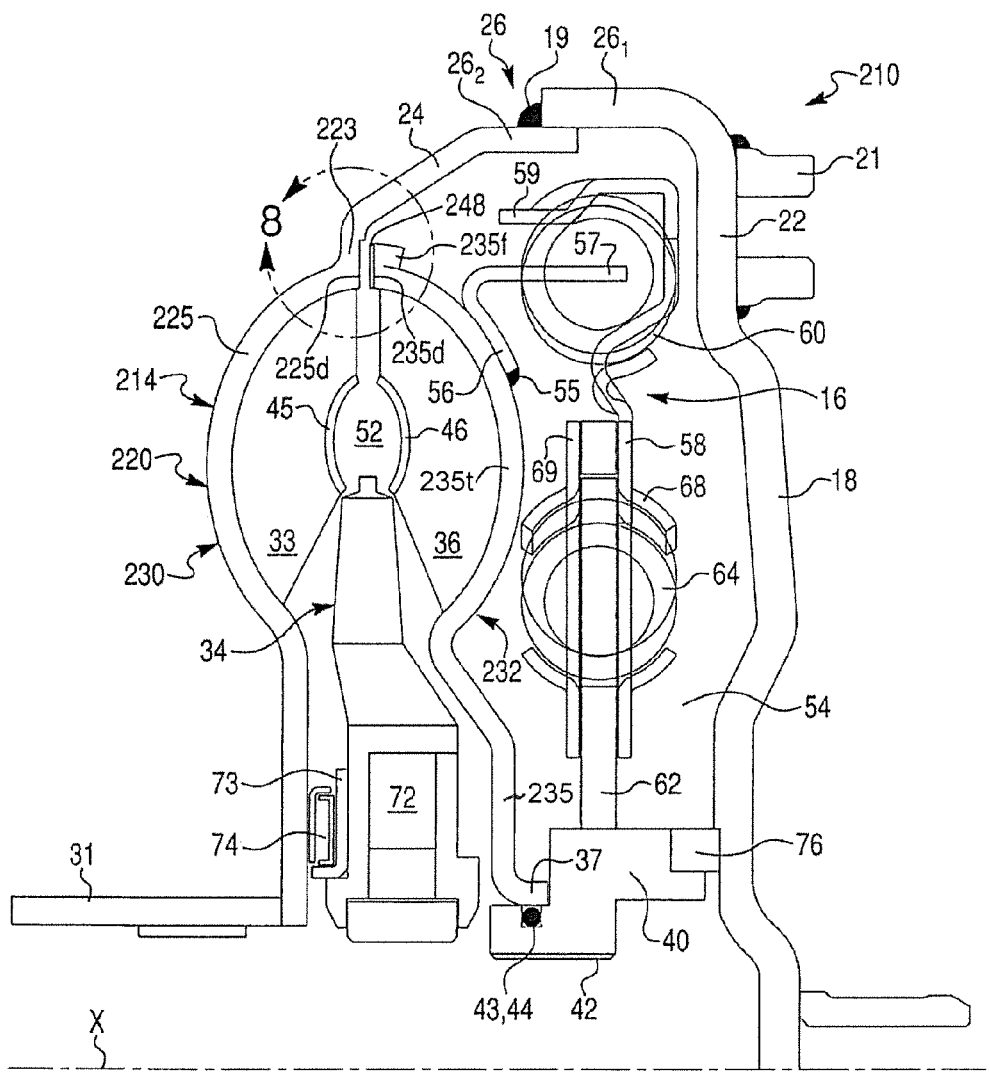

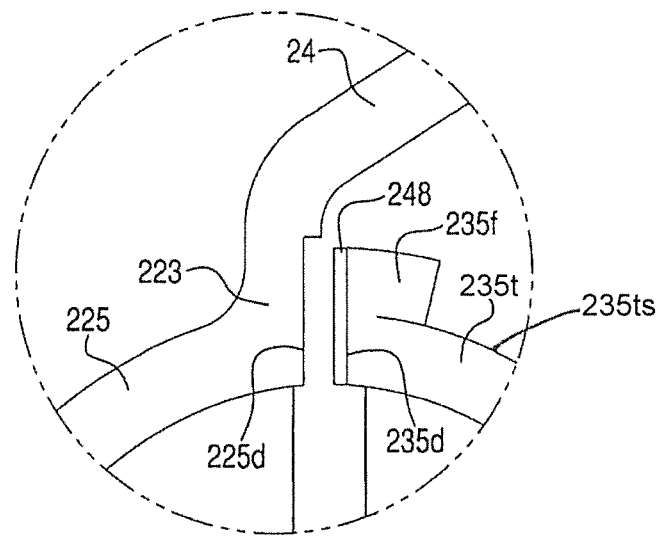
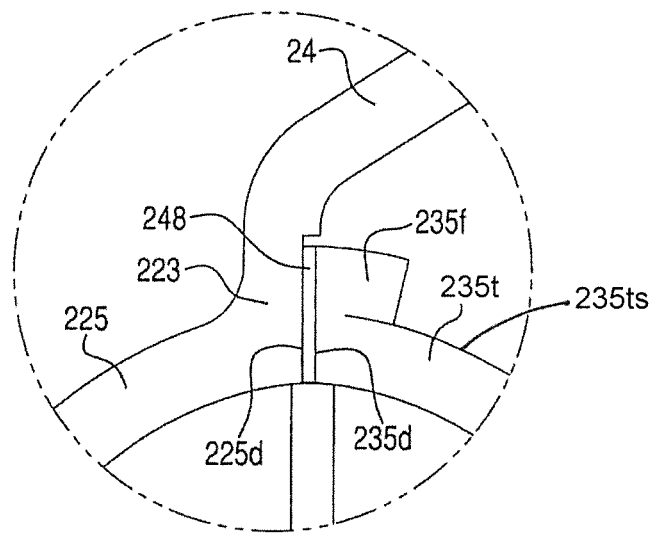

TORQUE CONVERTER AND HYDROKINETIC TORQUE COUPLING DEVICE HAVING TURBINE-PISTON LOCKUP CLUTCH, AND RELATED METHODS

BACKGROUND OF THE INVENTION

1. Field of the Invention

The present invention generally relates to torque converters and hydrokinetic torque coupling devices, and more particularly to a torque converter and hydrokinetic torque coupling device including a turbine-piston lockup clutch for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The torque coupling device includes an impeller rotatable about a rotational axis and a turbine-piston coaxially aligned with and hydrodynamically drivable by the impeller. The impeller includes an impeller shell and a plurality of impeller blades. The impeller shell includes a substantially toroidal impeller shell portion that at least partially houses the impeller blades and terminates at a first distal end clutch surface. The turbine-piston includes a turbine-piston shell and a plurality of turbine blades, the turbine-piston shell including a substantially toroidal turbine-piston shell portion that at least partially houses the turbine blades and terminates at a second distal end clutch surface that faces the first distal end clutch surface. The turbine-piston is axially movable to move the second distal end clutch surface towards and away from the first distal end clutch surface to position the hydrokinetic torque coupling device into and out of a lockup mode in which the turbine-piston is mechanically locked with the impeller shell so as to be non-rotatable relative to the impeller shell.

A second aspect of the invention provides a hydrokinetic torque coupling device for coupling together a driving shaft and a driven shaft. The torque coupling device includes an impeller rotatable about a rotational axis and a turbine-piston coaxially aligned with and hydrodynamically drivable by the impeller. The impeller includes an impeller shell and a plurality of impeller blades, the impeller shell including a substantially toroidal impeller shell portion and a clutch shell portion radially outside of the substantially toroidal impeller shell portion. The clutch shell portion has a first engagement surface oriented at an oblique angle relative to the rotational axis. The turbine-piston includes a turbine-piston shell and a plurality of turbine blades, the turbine-piston shell including a substantially toroidal turbine-piston shell portion and a flange portion radially outside of the substantially toroidal turbine-piston shell portion. The flange portion has a second engagement surface oriented at the oblique angle relative to the rotational axis. The turbine-piston is axially movable to move the second engagement surface towards and away from the first engagement surface to position the hydrokinetic torque coupling device into and out of a lockup mode in which the turbine-piston is mechanically locked with the impeller shell so as to be non-rotatable relative to the impeller shell.

A third aspect of the invention provides a hydrokinetic torque coupling device for coupling together a driving shaft and a driven shaft. The torque coupling device includes an impeller rotatable about a rotational axis, a turbine-piston coaxially aligned with and hydrodynamically drivable by the impeller, and a biasing member. The impeller includes an impeller shell and a plurality of impeller blades. The impeller shell includes a substantially toroidal impeller shell portion and a first flange portion radially outside of the substantially toroidal impeller shell portion, the substantially toroidal impeller shell portion at least partially housing the impeller blades and terminating at a first distal end clutch surface. The turbine-piston includes a turbine-piston shell and a plurality of turbine blades, the turbine-piston shell comprising a substantially toroidal turbine-piston shell portion that at least partially houses the turbine blades and terminates at a second distal end clutch surface that faces the first distal end clutch surface. The turbine-piston is axially movable to move the second distal end clutch surface towards and away from the first distal end clutch surface to position the hydrokinetic torque coupling device into and out of a lockup mode in which the turbine-piston is mechanically locked with the impeller shell so as to be non-rotatable relative to the impeller shell. The biasing member urges the second distal end clutch surface away from the first distal end clutch surface in a direction out of the lockup mode.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 2 is an enlarged view of a fragment of the hydrokinetic torque coupling device within circle 2 of FIG. 1 out of lockup mode;

FIG. 3 is an enlarged view of the fragment of the hydrokinetic torque coupling device within circle 2 of FIG. 1, but with the hydrokinetic torque coupling device shown in the lockup mode;

FIG. 7 is a fragmented half-view in axial section of a hydrokinetic torque coupling device equipped with a turbine-piston in accordance with a third exemplary embodiment of the present invention;

FIG. 8 is an enlarged view of a fragment of the hydrokinetic torque coupling device within circle 8 of FIG. 7 out of lockup mode;

FIG. 9 is an enlarged view of the fragment of the hydrokinetic torque coupling device within circle 8 of FIG. 7, but with the hydrokinetic torque coupling device shown in the lockup mode;

Figure 1:
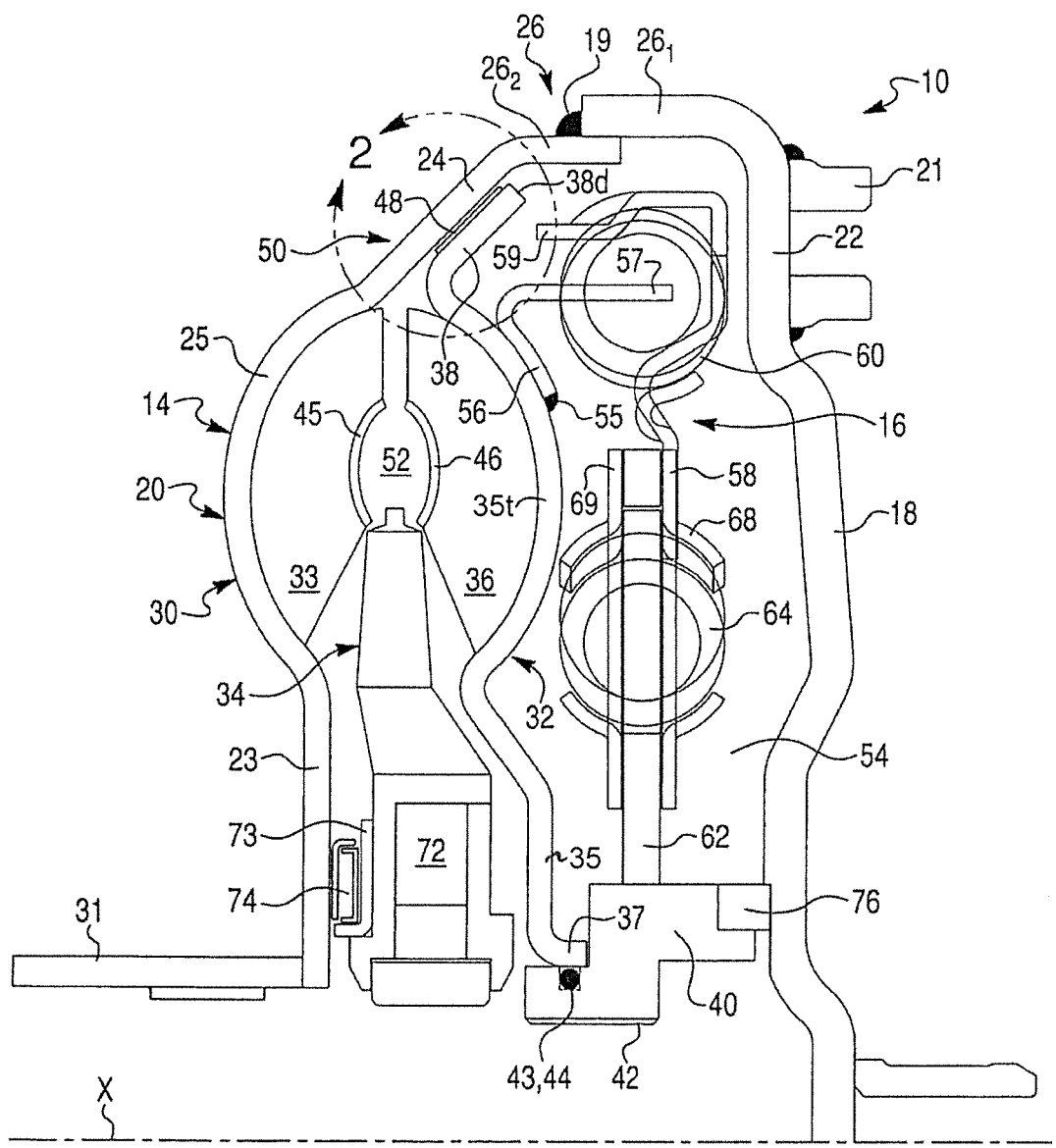
FIG. 1 is a fragmented half-view in axial section of a hydrokinetic torque coupling device equipped with a turbine-piston in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross-section of a portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly and sealingly connected together, such as by weld 19 at their outer peripheries, so as to be non-movable relative to one another yet rotatable about the axis X. The first shell 18 is interconnected to and non-movable relative to the driving shaft, more typically a flywheel (not shown) that is non-rotatably fixed to the driving shaft, so that the casing 12 rotates at the same speed that the engine operates. Specifically, in the illustrated embodiment of FIG. 1 the casing 12 is rotatably driven by the internal combustion engine and is coupled and non-rotatable relative to the flywheel thereof with studs 21, shown in FIG. 1. Each of the first and second casing shells 18, 20 may be made, for example, integrally by pressforming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. The second casing shell 20 includes a second radial sidewall portion 23 extending substantially radially relative to the direction from the rotational axis X, a substantially toroidal shell portion 25, an elbow portion 24 extending from the substantially toroidal shell portion 25 at an oblique angle of approximately forty-five (45) degrees to the rotational axis X, and a cylindrical second outer wall portion $26_2$ extending substantially axially from the elbow portion 24 toward the first casing shell 18. The elbow portion 24 includes a first engagement surface $24_1$, as best shown in FIGS. 2 and 3. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

The torque converter 14 includes an impeller (sometimes referred to as the pump or impeller wheel) 30, a turbine-piston 32, and a stator (sometimes referred to as the reactor) 34 situated axially between and operatively connecting the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to the impeller shell 20 and the impeller core ring 45. The impeller 30, including its shell 20, the impeller core ring 45, and the impeller blades 33, is secured to the first casing shell 18 a weld 19 so as to be non-rotatable relative to the casing 12 and hence to the drive shaft (or flywheel) of the engine so that the impeller 30 rotates at the same speed as the engine output. The impeller 30 includes an impeller hub 31 fixedly secured to the impeller shell 20. The impeller hub 31 is arranged for engagement with a hydraulic pump of the transmission.

The turbine-piston 32 is a consolidation or incorporation of a turbine with a lockup clutch piston. The turbine component of the turbine-piston 32 includes a turbine-piston shell 35, a turbine-piston core ring 46, and a plurality of turbine-piston blades 36 fixedly attached, such as by brazing, to the turbine-piston shell 35 and the turbine-piston core ring 46. In the hydrodynamic transmission mode, spinning of the impeller 30 causes transmission fluid in the torus to spin the turbine blades 36, and hence the turbine-piston core ring 46 and the turbine-piston shell 35. The impeller shell 20 and the turbine-piston shell 35 collectively define a substantially toroidal inner chamber (or torus chamber) 52 therebetween. As discussed in further detail below, a drive member 56 is affixed (i.e., non-moveably attached) to the turbine-piston shell 35, such as by an annular weld 55 and/or fasteners.

The piston component of the turbine-piston 32 includes a substantially annular, planar (i.e., flat) turbine-piston flange (or turbine-piston wall) 38. The turbine-piston flange 38 is distal to the rotational axis X relative to a proximal flange 37 discussed below. The turbine-piston flange 38 extends from a substantially toroidal portion 35t of the turbine-piston shell 35. As illustrated in FIG. 1, the turbine-piston flange 38 is disposed radially outside of the turbine-piston blades 36, whereas the substantially toroidal portion of the turbine-piston shell extends axially adjacent to the turbine-piston blades 36. The turbine-piston flange 38 and the turbine-piston shell 35 are embodied as integral with one another, e.g., made of a single or unitary component. Alternatively, the turbine-piston flange 38 and the turbine-piston shell 35 may be separate components connected together by a weld or fasteners. The turbine-piston flange 38 extends from a radially outer peripheral end of the substantially toroidal portion 35t of the turbine-piston shell 35 outward at an oblique angle, such as about 45 degrees, relative to the rotational axis X, to extend away from the impeller blades 33. The turbine-piston flange 38 terminates at a distal end 38d in spaced relationship to the inner peripheral surface of the annular outer wall portion $26_2$ of the casing 12. terminates at a distal end 38d in spaced relationship to the inner peripheral surface of the annular outer wall portion $26_2$ of the casing 12.

The turbine-piston flange 38 has a second engagement surface region $38_2$ facing the first engagement surface region $24_1$ of the elbow portion 24. The first and second engagement surface regions $24_1$ and $38_2$ are parallel to and face one another, and extend at the same oblique angle, such as about 45 degrees, relative to the rotational axis X. The turbine-piston 32 is axially displaceable to move the second engagement surface region $38_2$ axially toward and away from the first engagement surface region $24_1$ to position the hydrokinetic torque coupling device 10 into and out of a lockup mode, respectively.

In accordance with the exemplary embodiment, the second engagement surface region $38_2$ is provided with a friction ring (or friction lining) 48, best shown in FIGS. 2 and 3. The friction ring 48 may be secured to the second engagement surface region $38_2$, for example, by adhesive bonding and/or with fasteners. The friction ring 48 is made of a friction material for improved frictional performance. Alternatively, a friction ring (or friction lining) may be secured to the first engagement surface region $24_1$. According to still another embodiment, a the first engagement surface region $24_1$ has a first friction ring or liner and the second engagement surface region $38_2$ has a second friction ring or liner. It is within the scope of the invention to omit one or both of the friction rings 48.

Returning to FIG. 1, the stator 34 is positioned axially between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is shown situated between a side wall plate 73 of the stator 34 and the impeller shell 20 of the casing 12.

The hydrokinetic torque coupling device 10 further includes an output hub 40 that is rotatable about the rotational axis X. The output hub 40 is operatively coupled to and coaxial with the driven shaft. For example, the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft. A sealing member (not shown) may be mounted to a radially inner peripheral surface of the output hub 40 to create a seal at the interface of a transmission input shaft (not shown) and the output hub 40. A radially outer surface of the output hub 40 includes an annular slot 43 for receiving a sealing member, such as an O-ring 44.

Extending axially at a radially inner peripheral end of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 received in the slot 43 creates a seal at the interface of the substantially cylindrical flange 37 and the output hub 40. As discussed in further detail below, the turbine-piston 32 is axially movably relative to the output hub 40 along this interface. Abutment of the end of the flange 37 against the output hub 40, as shown in FIG. 1, limits axial displacement of the turbine-piston 32 to a maximum axial displacement position. The output hub 40 thus acts as a stop feature with respect to axial displacement of the turbine-piston 32.

The damper assembly 16 is housed in the casing 12 axially between the turbine-piston 32 and the first casing shell 18, as shown in FIG. 1. The torsional vibration damper 16 is connected to the drive member 56, and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1 and other embodiments discussed herein, the first and second damping members 60, 64 are configured as helical (or coil) springs having principal axes oriented substantially circumferentially. Other elastic members may be selected to replace or supplement the springs.

The drive member 56 is fixedly (i.e., non-moveably) connected to the substantially toroidal portion 35t of the turbine-piston shell 35 of the turbine-piston 32, such as by weld 55, which may be a continuous, annular weld bead. The output side of the drive member 56 has a plurality of driving tabs 57 (FIG. 1) extending axially in the direction away from the turbine-piston 32. The driving tabs 57 of the drive member 56 are circumferentially equidistantly spaced from one another, and engage first circumferential ends of the first damping members 60.

The intermediate member 58 has a plurality of driven tabs 59 extending axially in an opposition direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 and the driven tabs 59 of the damper assembly 16 are rotatable relative to the drive member 56 and the driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston shell 35 between its lockup and non-lockup modes. As discussed in greater detail below, when the turbine-piston shell 35 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to, and may be integrally formed as a single piece with, a first disk part 68 on a first side of the second damping members 64. The first disk part 68 is secured to and non-moveable relative to a second disk part 69 on the opposite side of the second damping members 64, such as by rivets or welding. The first and second disk parts 68, 69 establish an input part to the second damping members 64.

The driven member 62 establishes an output part relative to the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is fixedly connected to so as to be non-rotatable relative to the output hub 40. The non-rotatable connection between the driven member 62 and the output hub 40 may be formed by splines or welding. Alternatively, the output hub 40 and driven member 62 may be integrally formed as a single-piece part. A thrust bearing 76 is positioned between the output hub 40 and the first casing shell 18.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. If a spring is present (for example between the stator 34 and the turbine-piston shell 35 or elsewhere) for urging the turbine-piston shell 35 into or out of lockup, the biasing force of that spring should be taken into account in determining pressures. Referring to FIG. 1, the torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) acts in combination with the urging force of the optional biasing member to shift the turbine-piston shell 35 axially in the direction of torque transmission, i.e., towards the output side of the casing 12, that is right to left in FIG. 1, into the lockup mode. On the other hand, a pressure decrease in the damper chamber 54 relative to the torus chamber 52 (or stated differently a pressure increase in the torus chamber 52 relative to the damper chamber 54) acts in combination with the urging force of the optional biasing member to shift the turbine-piston shell 35 and the turbine-piston flange 38 axially against the direction of torque transmission, i.e., towards the input side of the casing, that is left to right in FIG. 1, out of the lockup mode. Pressure changes are created by control of the fluid, e.g., hydraulic fluid or oil, in the chambers 52 and 54.

In the lockup mode, the turbine-piston 32 is displaced axially towards the impeller 30 until the frictional ring 48 of the second engagement surface region $38_2$ of the turbine-piston flange 38 (which moves axially with the turbine-piston shell 35) abuts against and is non-rotatably frictionally coupled to the first engagement surface region $24_1$ of the casing 12. In the lockup mode, torque is transferred from the engine to the casing 12, then by way of the frictional engagement between surface regions $24_1$ and $38_2$ (or the frictional ring(s) 48 thereof) through the turbine piston shell 35 to the drive member 56 welded thereto, then serially to the damping assembly 16 and the output hub 40. Thereby, the turbine-piston flange 38 and the casing 12 together create a lockup clutch 50 that bypasses the hydrodynamic transmission mode of the torque converter 14 and mechanically locks the driving and driven shafts to one another.

In the embodiment shown in FIGS. 1-3, the elbow portion 24 and the turbine-piston flange 38 are set at an oblique angle relative to the rotational axis X. Consequently, the slanted wall design of FIG. 1 is able to create greater contact surface between the first and second engagement surfaces $24_1$, $38_2$ (including their frictional lining(s) 48) than a comparably sized device (of the same radial width as defined by outer wall 26) having engagement surfaces that extend radially, i.e., perpendicular to the rotational axis X. Accordingly, greater torque capacity and less slippage over a smaller radial area should be achieved.

As the turbine-piston 32 moves axially into the lockup position as described above, the driving tabs 57 of the drive member 56 welded to the turbine-piston shell 35 are axially displaced relative to the driven tabs 59 of the intermediate member 58. The axial movement of the driving tabs 57 relative to the driven tabs 59 allows the intermediate member 58, the driven member 62, and the damping members 60, 64 to remain fixed axially on the output hub 40 while the turbine-piston 32 and the drive member 56 move in the axial direction. Notably, the friction ring 48 secured to the second engagement surface $38_2$ may have circumferentially spaced grooves (not shown) extending generally radially so as to fluidly connect the torus chamber 52 and the damper chamber 54 with one another in the lockup mode for cooling friction surfaces of the lockup clutch 50 by the working fluid.

In the non-lockup mode, the turbine-piston 32 is displaced axially away from the impeller 30, axially moving the turbine-piston shell 35 and the turbine-piston flange 38 so that the second engagement surface region $38_2$ (including the frictional lining 48 thereof) is spaced from and no longer non-rotatably frictionally coupled to the first engagement surface region $24_1$. Thus, torque transferred from the engine to the casing 12 does not bypass the torque converter 14 through the lockup clutch 50. Driving tabs 57 move axially towards the driven tabs 59 as the lockup clutch 50 is moved from lockup to non-lockup mode. Notably, in the non-lockup mode an open fluid passage is established between the first engagement surface $24_1$ of the casing 12 and the second engagement surface $38_2$ for permitting fluid flow between the torus chamber 52 and the damper chamber 54.

In operation, the lockup clutch 50 is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown in FIG. 1, a biasing member, such as a spring, may be included in the hydrokinetic torque coupling device 10 to axially urge the turbine-piston 32 into or out of lockup mode.

The turbine-piston 32 both forms the shell component of the turbine and the piston component of the lockup clutch, as described above. By consolidating two components that are normally separate from one another into a single component, space is saved in the hydrokinetic torque coupling device 10. Further space is saved by angling the elbow portion 24 and the turbine-piston flange 38. These space-saving structures provide several design options. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment. For example, FIGS. 4-15 illustrate additional exemplary embodiments. In the interest of brevity, reference characters that are discussed above in connection with FIGS. 1-3 are not further elaborated upon below, except to the extent necessary or useful to explain the additional embodiments. Modified components and parts are indicated by the addition of one hundreds, two hundreds, etc. digit to the reference numerals of the components or parts for the second exemplary embodiment, third exemplary embodiment, etc.

Figure 4:
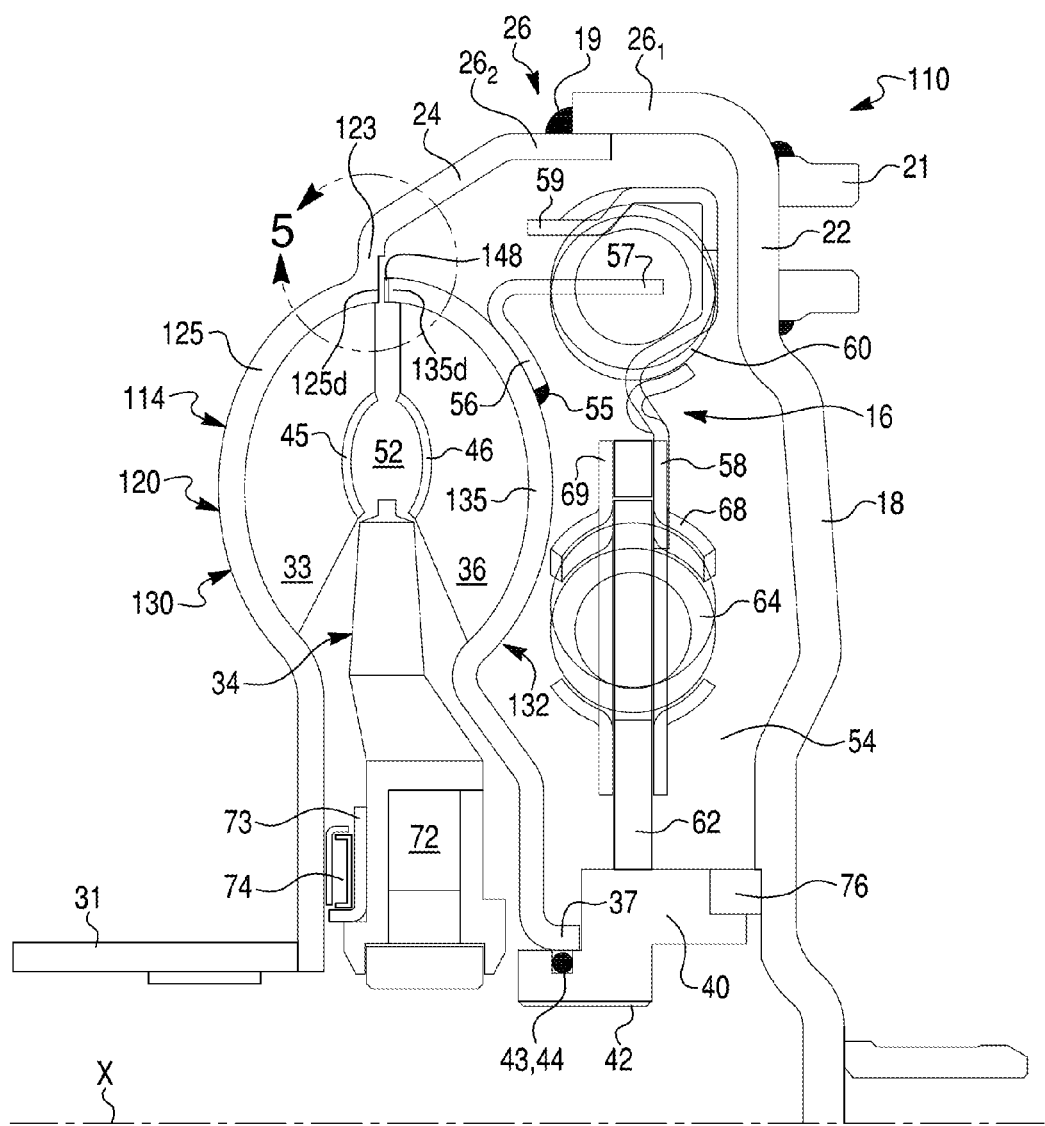
FIG. 4 is a fragmented half-view in axial section of a hydrokinetic torque coupling device equipped with a turbine-piston in accordance with a second exemplary embodiment of the present invention.
Figure 5:
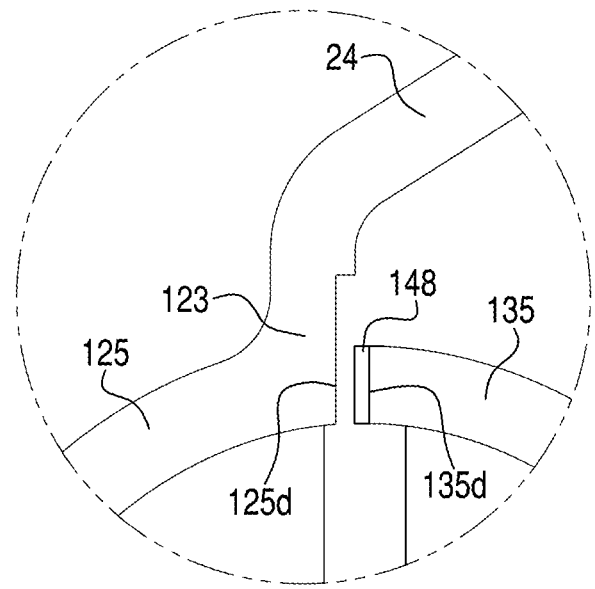
FIG. 5 is an enlarged view of a fragment of the hydrokinetic torque coupling device within circle 5 of FIG. 4 out of lockup mode.
Figure 6:
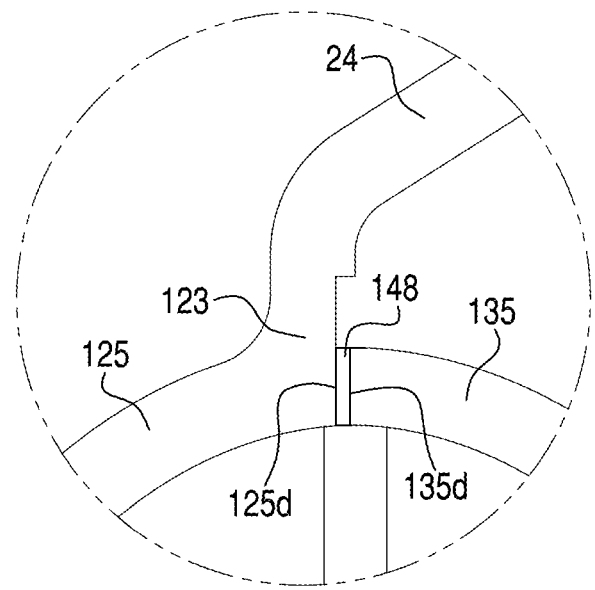
FIG. 6 is an enlarged view of the fragment of the hydrokinetic torque coupling device within circle 5 of FIG. 4, but with the hydrokinetic torque coupling device shown in the lockup mode.

A second exemplary embodiment of a hydrokinetic torque coupling device 110 illustrated in FIGS. 4-6 includes a torque converter 114 having an impeller 130 with a modified impeller shell 120 and a turbine-piston 132 with a modified turbine-piston shell 135. A substantially toroidal impeller shell portion 125 of the impeller shell 120 terminates at a first distal end clutch surface 125d. A second radial sidewall portion 123 extending substantially perpendicularly relative to the direction from the rotational axis X above first distal end clutch surface 125d is recessed, such as by shaping or machining, to expand the distal end clutch surface 125d radially outward. The turbine-piston shell 135 of FIGS. 4-6 is modified to omit a flange member, i.e., the turbine-piston shell 135 does not include a flange comparable to turbine-piston flange 38 of the first embodiment of FIGS. 1-3. The turbine-piston shell 135 has a substantially toroidal turbine-piston shell portion that terminates at a second distal end clutch surface 135d that faces the first distal end clutch surface 125d. The second distal end clutch surface 135d includes a friction ring 148 facing the first distal end clutch surface 125d.

The turbine-piston 132 is axially movable to move the second distal end clutch surface 135d with its friction ring 148 towards and away from the first distal end clutch surface 125d to position the hydrokinetic torque coupling device 110 into and out of a lockup mode in which the clutch surfaces 125d, 135d are frictionally engaged to mechanically lock the turbine-piston 132 with the impeller shell 120 so as to be non-rotatable relative to the impeller shell 120. The smaller engagement surface area between the first and second distal end clutch surfaces 125d, 135d compared to the angled surfaces $24_1$, $38_2$ of the first embodied device 10 reduces torque capacity of the device 110 compared to device 10, but creates a significant amount of extra space inside the casing 12 of the device 110, allowing the casing 12 to be reduced in size and/or additional components, such as damper components, to be fit into the casing 12.

A third exemplary embodiment of a hydrokinetic torque coupling device 210 illustrated in FIGS. 7-9 includes a torque converter 214 having an impeller 230 with a modified impeller shell 220 and further having a turbine-piston 232 with a modified turbine-piston shell 235. A substantially toroidal impeller shell portion 225 of the impeller shell 220 terminates at a first distal end clutch surface 225d. A radial sidewall portion 223 extending substantially perpendicularly relative to the direction from the rotational axis X above first distal end clutch surface 225d is recessed, such as by shaping or machining, to expand the distal end clutch surface 225d radially outward. The turbine-piston shell 235 is modified to omit a distal flange member, i.e., the turbine-piston shell 235 does not include a distal flange comparable to turbine-piston flange 38 of the first embodiment of FIGS. 1-3. The turbine-piston shell 235 includes a substantially toroidal turbine-piston shell portion 235t that terminates at a second distal end clutch surface 235d that faces the first distal end clutch surface 225d. The turbine-piston shell 235 further includes a folded-over portion 235f disposed radially outward of and folded over onto the substantially toroidal turbine-piston shell portion 235t so as to extend in the direction axially away from the second distal end clutch surface 235d, to engage an outer peripheral surface 235ts of the toroidal turbine-piston shell portion 235t and to thereby increase the surface area of the second distal end clutch surface 235d. In other words, the second distal end clutch surface 235d is defined by both the toroidal turbine-piston shell portion 235t and the folded-over portion 235f of the turbine-piston shell 235. The second distal end clutch surface 235d, including the portion of the second distal end clutch surface 235d established by the folded-over portion 235f, includes a friction ring 248 facing the first distal end clutch surface 225d. The drive member 56 is fixedly connected to the substantially toroidal portion 235t of the turbine-piston shell 235 of the turbine-piston 232, such as by the weld 55, so that the folded-over portion 235f is spaced from the drive member 56.

The turbine-piston 232 is axially movable to move the second distal end clutch surface 235d with its friction ring 248 towards and away from the first distal end clutch surface 225d to position the hydrokinetic torque coupling device 210 into and out of a lockup mode in which the turbine-piston 232 is mechanically locked with the impeller shell 220 so as to be non-rotatable relative to the impeller shell 220. The smaller engagement surface area between the first and second distal end clutch surfaces 225d, 235d compared to the angled surfaces $24_1$, $38_2$ of the first embodied device 10 reduces torque capacity of the device 210 compared to device 10 but creates a significant amount of extra space inside the casing 12 of device 210, allowing the casing 12 to be reduced in size and/or additional components, such as damper components, to be fit into the casing 12. At the same time, the folded-over portion 235f and the machined recess of the radial sidewall portion 223 increase engagement surface area between the first and second distal end clutch surfaces 225d, 235d compared to surfaces 125d, 135d of the second embodied device 110, thereby increasing torque capacity of the lockup clutch.

Figure 10:
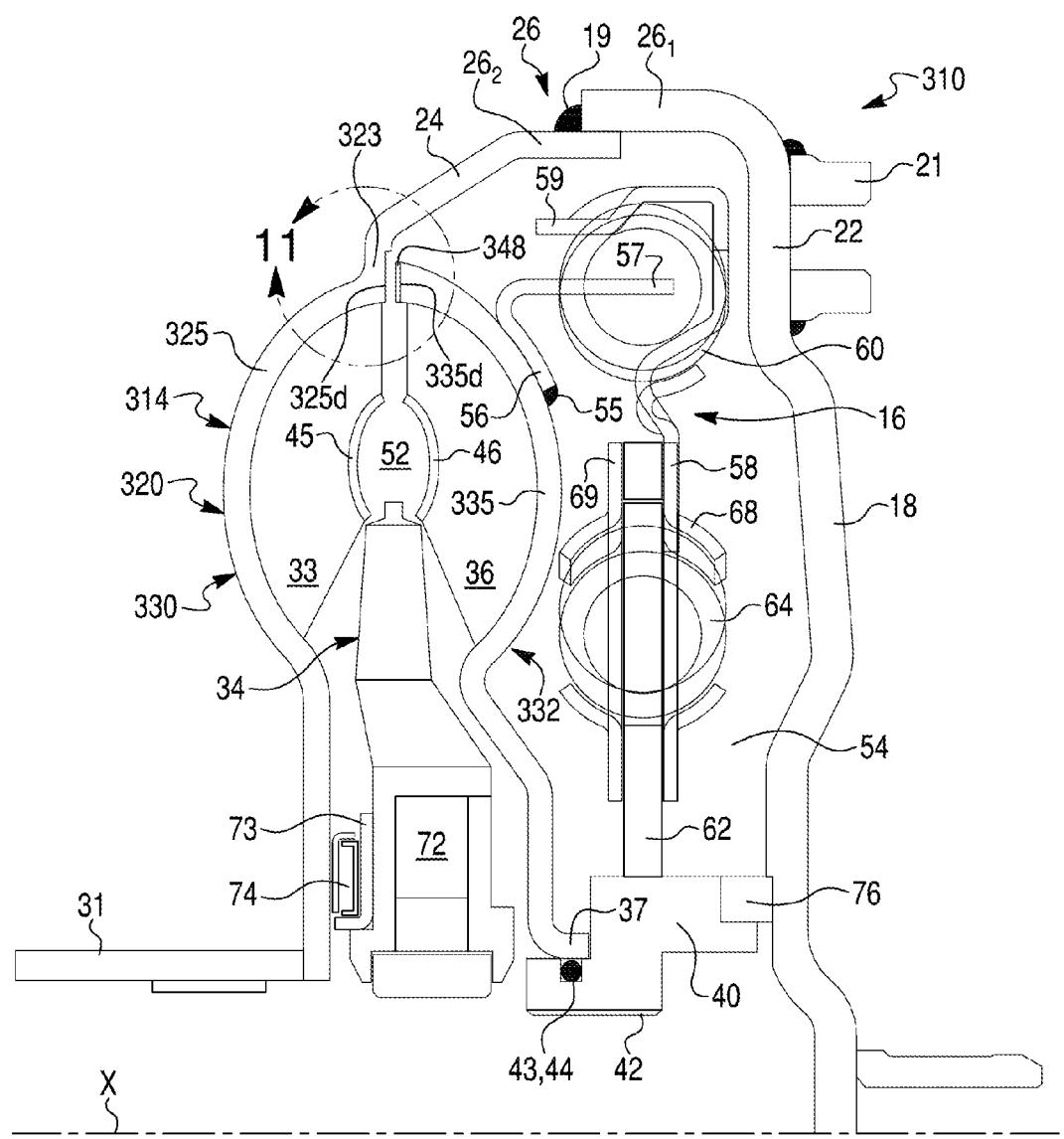
FIG. 10 is a fragmented half-view in axial section of a hydrokinetic torque coupling device equipped with a turbine-piston in accordance with a fourth exemplary embodiment of the present invention.
Figure 11:
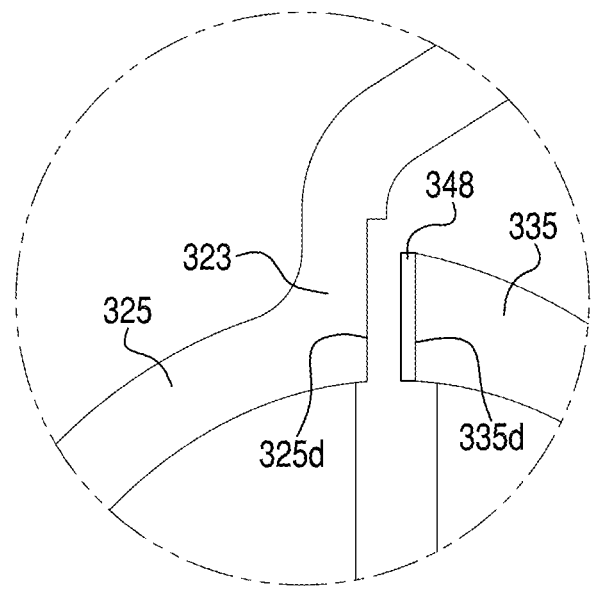
FIG. 11 is an enlarged view of a fragment of the hydrokinetic torque coupling device within circle 11 of FIG. 10 out of lockup mode.
Figure 12:
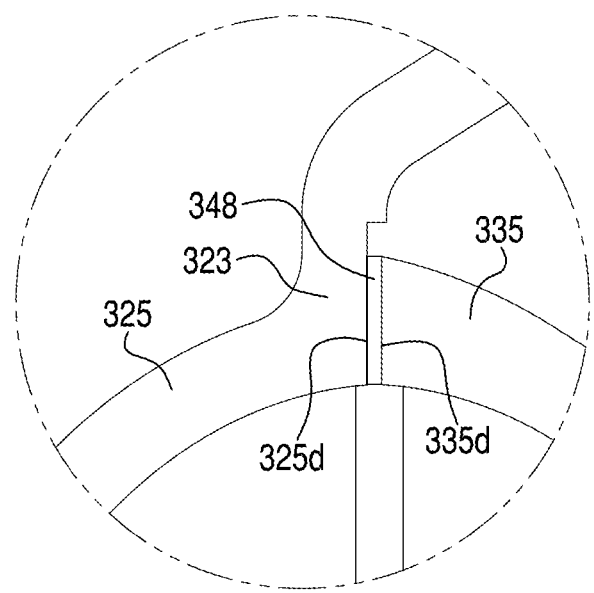
FIG. 12 is an enlarged view of the fragment of the hydrokinetic torque coupling device within circle 11 of FIG. 10, but with the hydrokinetic torque coupling device shown in the lockup mode.

A fourth exemplary embodiment of a hydrokinetic torque coupling device 310 illustrated in FIGS. 10-12 includes a torque converter 314 having an impeller 330 with a modified impeller shell 320 and a turbine-piston 332 with a modified turbine-piston shell 335. A substantially toroidal impeller shell portion 325 of the impeller shell 320 terminates at a first distal end clutch surface 325d. A radial sidewall portion 323 extending substantially perpendicularly relative to the direction from the rotational axis X above first distal end clutch surface 325d is recessed, such as by shaping or machining, to expand the distal end clutch surface 325d radially outward. The turbine-piston shell 335 is modified to omit a distal flange member, i.e., the turbine-piston shell 335 does not include a flange comparable to turbine-piston flange 38 of the first embodiment of FIGS. 1-3. The turbine-piston shell 335 has a substantially toroidal turbine-piston shell portion that terminates at a second distal end clutch surface 335d that faces the first distal end clutch surface 325d. The second distal end clutch surface 335d has an increased thickness relative to the remainder of the substantially toroidal portion of the turbine-piston shell 335 to thereby increase the surface area of the second distal end clutch surface 335d. The second distal end clutch surface 335d includes a friction ring 348 facing the first distal end clutch surface 325d.

The turbine-piston 332 is axially movable to move the second distal end clutch surface 335d with its friction ring 348 towards and away from the first distal end clutch surface 325d to position the hydrokinetic torque coupling device 310 into and out of a lockup mode in which the first and second distal end clutch surfaces 325d, 335d are frictionally engaged to mechanically lock the turbine-piston 332 with the impeller shell 320 so as to be non-rotatable relative to the impeller shell 320. The smaller engagement area between the first and second distal end clutch surfaces 325d, 335d compared to the angled surfaces $24_1$, $38_2$ of the first embodied device 10 reduces torque capacity of the device 310 but creates a significant amount of extra space inside the casing 12 in the device 310, allowing the casing 12 to be reduced in size and/or additional components, such as damper components, to be fit into the casing 12. At the same time, the increased thickness of the second distal end clutch surface 335d and the machined recess of the radial sidewall portion 323 increase engagement surface area between the first and second distal end clutch surfaces 325d, 335d compared to surfaces 125d, 135d of the second embodied device 110, thereby increasing torque capacity of the fourth embodied device 310.

Figure 13:
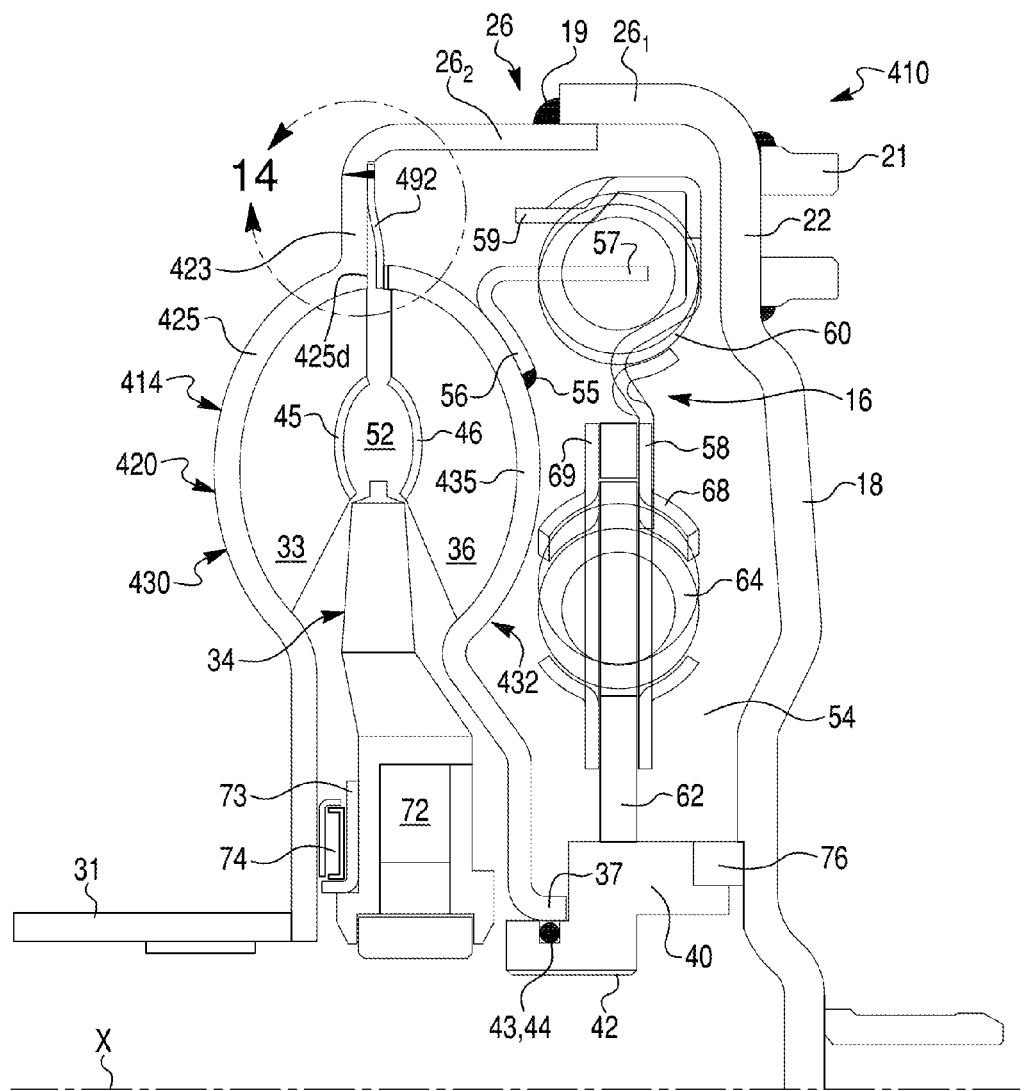
FIG. 13 is a fragmented half-view in axial section of a hydrokinetic torque coupling device equipped with a turbine-piston in accordance with a fifth exemplary embodiment of the present invention.
Figure 14:
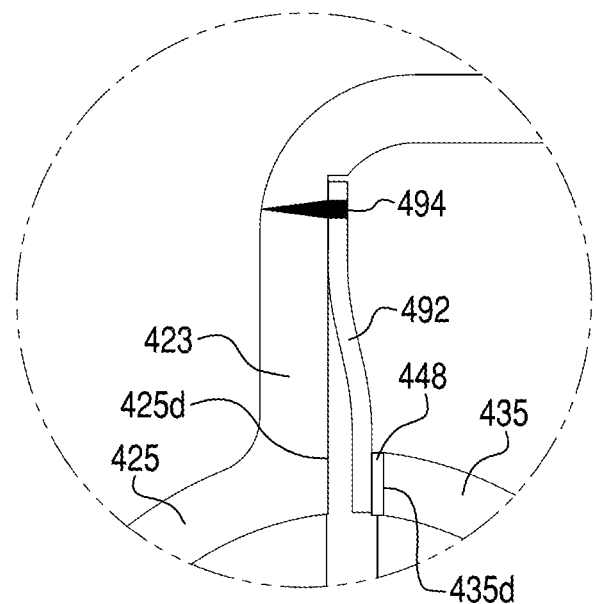
FIG. 14 is an enlarged view of a fragment of the hydrokinetic torque coupling device within circle 14 of FIG. 13 out of lockup mode.
Figure 15:
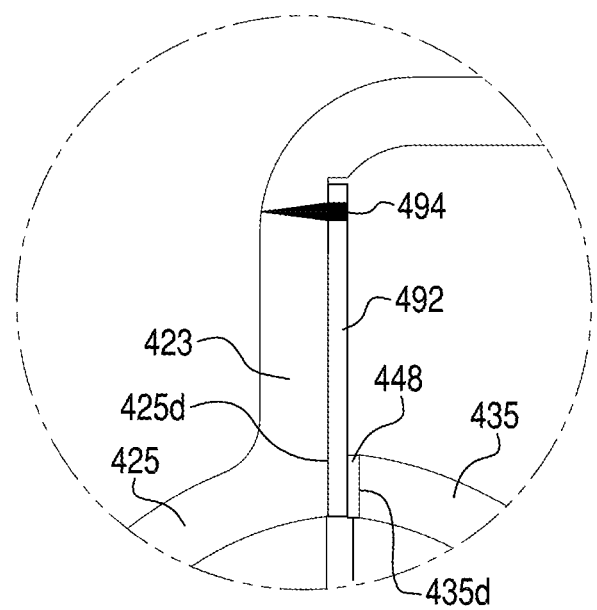
FIG. 15 is an enlarged view of the fragment of the hydrokinetic torque coupling device within circle 14 of FIG. 13, but with the hydrokinetic torque coupling device shown in the lockup mode.

A fifth exemplary embodiment of a hydrokinetic torque coupling device 410 illustrated in FIGS. 13-15 includes a torque converter 414 with an impeller 430 having a modified impeller shell 420 and a turbine-piston 432 having a modified turbine-piston shell 435. A substantially toroidal impeller shell portion 425 of the impeller shell 420 terminates at a first distal end clutch surface 425d. A radial sidewall portion 423 extending substantially perpendicularly relative to the direction from the rotational axis X above first distal end clutch surface 425d is recessed, such as by shaping or machining, to expand the distal end clutch surface 425d radially outward. The turbine-piston shell 435 is modified to omit a distal flange member, i.e., the turbine-piston shell 435 does not include a flange comparable to turbine-piston flange 38 of the first embodiment of FIGS. 1-3. The turbine-piston shell 435 has a substantially toroidal turbine-piston shell portion that terminates at a second distal end clutch surface 435d that faces the first distal end clutch surface 425d. Although not shown, the second distal end clutch surface 435d may be folded over as in FIGS. 7-9 or may have an increased thickness relative to the remainder of the substantially toroidal portion of the turbine-piston shell 435 as in FIGS. 10-12 to thereby increase the surface area of the second distal end clutch surface 435d. The second distal end clutch surface 435d includes a friction ring 448 facing the first distal end clutch surface 425d.

A biasing member 492 includes a first (radially outer) end portion attached by fastener or weld 494 to the recessed region of the radial sidewall portion 423, and an opposite second (radially inner) end portion extending between the first distal end clutch surface 425d and the second distal end clutch surface 435d, more particularly between the first distal end clutch surface 425d and the friction ring 438 of the second distal end clutch surface 435d. The biasing member 492 may be, for example, a spring washer, or a rubber or elastomeric material.

The turbine-piston 432 is axially movable to move the second distal end clutch surface 435d with its friction ring 448 towards and away from the first distal end clutch surface 425d to position the hydrokinetic torque coupling device 410 into and out of a lockup mode. In the lockup mode, the first and second distal end surfaces 425d, 435d are frictionally engaged to one another, with the friction ring 438 captured therebetween, to mechanically lock the turbine-piston 432 with the impeller shell 420 so that the turbine-piston is non-rotatable relative to the impeller shell 420. The biasing member 492 applies a biasing force to the second distal end clutch surface 435d to urge the second distal end clutch surface 435d away from the first distal end clutch surface 425d in a direction out of the lockup mode. The pressure differential between the torus chamber 52 and the damper chamber 54 is controlled taking into consideration the added urging force of the biasing member 492 to control movement of the turbine-piston 430 into and out of lockup mode.

To allow fluid communication between the torus chamber 52 and the damper chamber 54, the biasing member 492 may be discontinuous, i.e., not continuously annular. Alternatively, the biasing member 492 may include one or more through passages. As still another alternative, the biasing member 492 may comprise a plurality of biasing members circumferentially spaced from one another with gaps between the biasing members 492. In any of these embodiments, the biasing member 492 may create or increase a pressure drop between the torus chamber 52 and the damper chamber 54. This heightened pressure drop reduces the possibility of unintended/premature axial displacement of the turbine-piston 432 into lockup mode.

Other variations and modifications include modifying the damper assembly 16 to include only damping members 60 or damping members 64, or to include additional or no damping members. The features of the above-described embodiments may be practiced with one another and are substitutable in numerous combinations.

An exemplary method for assembling the hydrokinetic torque coupling device 10 according to the embodiment of FIGS. 1-3 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 10, 110, 210, 310, and 410 may be practiced by sequentially performing the steps as set forth below, it should be understood that the methods may involve performing the steps in different sequences.

The impeller 30, the turbine-piston 32, the stator 34, and the damper assembly 16 may each be preassembled. The turbine-piston 32 includes, as noted above, the turbine-piston shell 35 the turbine blades 36 attached to the turbine-piston shell 35, and the turbine-piston flange 38. In alternative embodiments such as shown in FIGS. 4-12, the substantially toroidal portion of the turbine-piston shell 35 terminates in a clutch surface.

The impeller 30, the stator 34, and the turbine-piston 32 subassemblies are assembled together as shown in the drawings. The cylindrical flange 37 of the turbine-piston 32 is mounted to slidingly engage the output hub 40 (which is splined with or mounted on the driven shaft at 42) with the seal 44 therebetween. The damper assembly 16 is then added. The driving tabs 57 are engaged with the damper assembly 16 as described above. Then, the first casing shell 18 is sealingly and non-movably secured, such as by welding at 19, to the second casing shell 20, as best shown in FIG. 1. In the fifth exemplary embodiment 410 of FIGS. 13-15, the biasing member 492 may be pre-fastened or pre-welded at 494 to the radially extending portion 423 of the impeller shell 420, before combining the turbine-piston 430 with the impeller 420.

Figure 16:
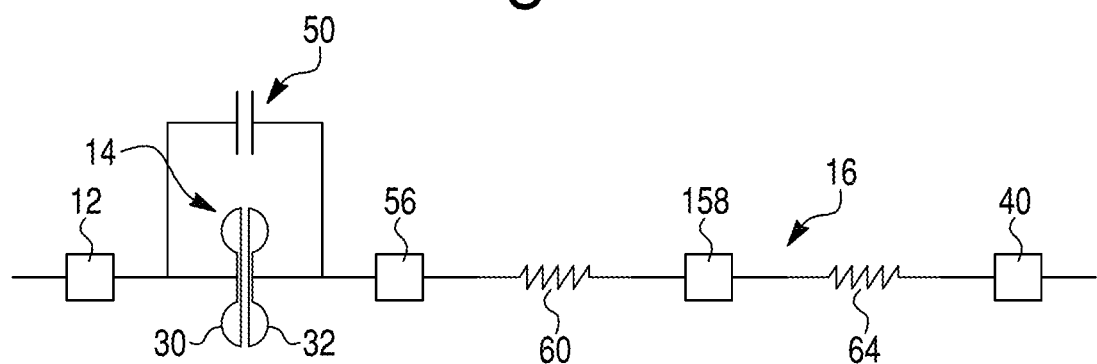
FIG. 16 is a simplified diagram of a hydrodynamic torque coupling device including a turbine-piston with a dual or double damper assembly.

The torque converters and hydrodynamic torque coupling devices described herein may incorporate different damper assemblies. For example, FIG. 16 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60, the intermediate member 58, and the elastic damping members 64 of the damper assembly 16 and the output hub 40 are arranged serially downstream of the turbine-piston shell 35 and the drive member 56 in FIG. 16. The diagram of FIG. 16 generally corresponds to the arrangement of the embodiments shown in FIGS. 1-15.

Figure 17:
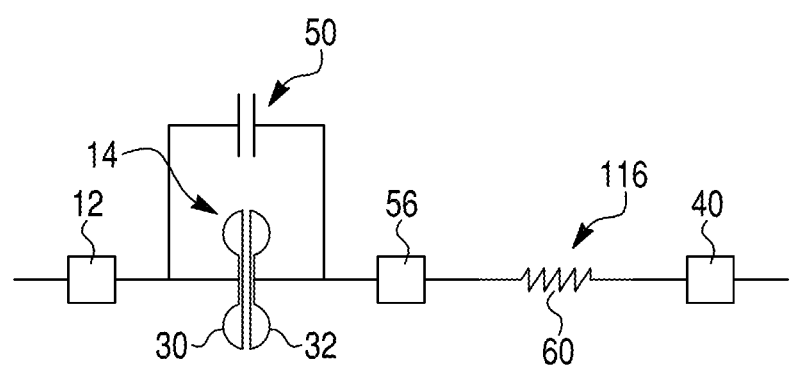
FIG. 17 is a simplified diagram of another hydrodynamic torque coupling device including a turbine-piston with a single damper assembly.

FIG. 17 shows an alternative damper assembly 116 similar to that of FIG. 16, but in which the damper assembly 116 is modified to include only one set of circumferentially extending elastic damping members 60.

Figure 18:
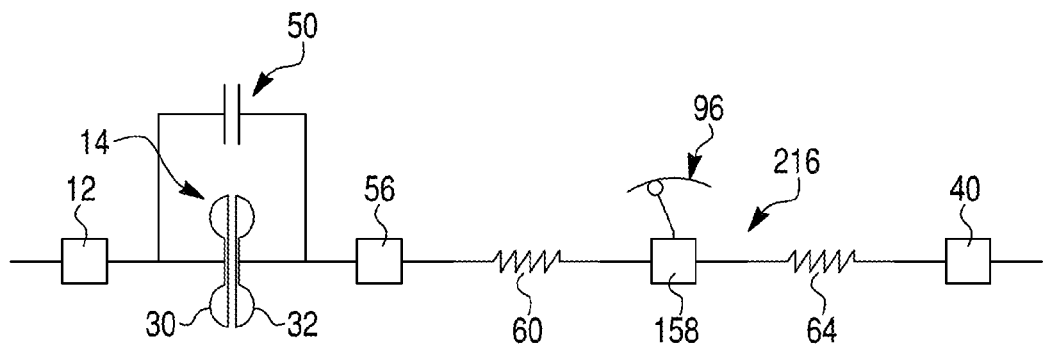
FIG. 18 is a simplified diagram of still another hydrodynamic torque coupling device including a turbine-piston with dual or double damper assemblies and a pendulum vibration absorber.

A damper assembly 216 shown in FIG. 18 is similar to that of FIG. 16, but further includes a centrifugal pendulum oscillator 96 coupled to the intermediate member 158. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 96 may be coupled to the circumference of the intermediate member 158 and may be arranged on both sides of the intermediate member 158.

Figure 19:
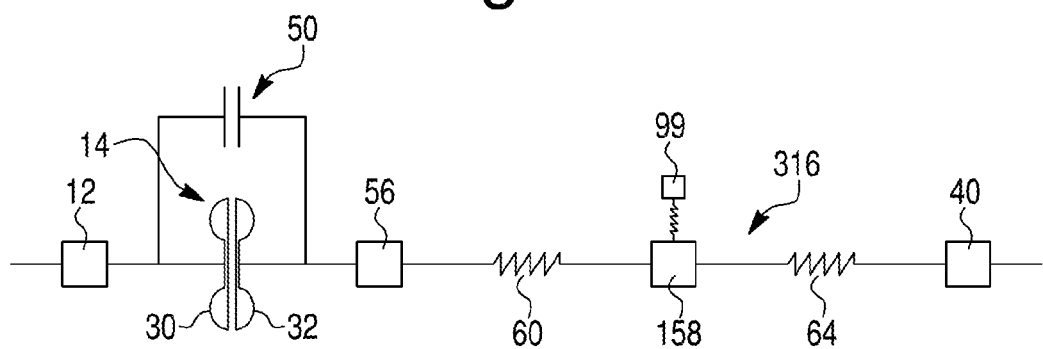
FIG. 19 is a simplified diagram of a further hydrodynamic torque coupling device including a turbine-piston with dual or double damper assemblies and a vibration absorbing spring-mass system.

A damper assembly 316 shown in FIG. 19 is similar to that of FIG. 16, but further includes a spring mass system 99 coupled to the intermediate member 158. Spring-mass systems are well known in the art and described in, for example, WO 2004/018897 to Haller. The spring-mass system 99 may be coupled to the circumference of the intermediate member 158. The spring of the spring-mass system 99 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling together a driving shaft and a driven shaft, the torque coupling device comprising:
   an impeller rotatable about a rotational axis and comprising an impeller shell and a plurality of impeller blades, the impeller shell comprising a substantially toroidal impeller shell portion that at least partially houses the impeller blades and terminates at a first distal end clutch surface; and
   a turbine-piston coaxially aligned with and hydrodynamically drivable by the impeller, the turbine-piston comprising a turbine-piston shell and a plurality of turbine blades, the turbine-piston shell comprising a substantially toroidal turbine-piston shell portion that at least partially houses the turbine blades and a folded-over portion disposed radially outward of and folded over onto the substantially toroidal turbine-piston shell portion so as to engage the toroidal turbine-piston shell portion of the turbine-piston shell;
   the turbine-piston shell terminates at a second distal end clutch surface defined by the substantially toroidal turbine-piston shell portion and the folded-over portion, the second distal end clutch surface facing the first distal end clutch surface, the turbine-piston being axially movable to move the second distal end clutch surface towards and away from the first distal end clutch surface to position the hydrokinetic torque coupling device into and out of a lockup mode in which the turbine-piston is mechanically locked with the impeller shell so as to be non-rotatable relative to the impeller shell.

2. The hydrokinetic torque coupling device of claim 1, further comprising a stator situated between the impeller and the turbine-piston.

3. The hydrokinetic torque coupling device of claim 1, wherein the first and second distal end clutch surfaces are frictionally, non-rotatably coupled to one another in the lockup mode.

4. The hydrokinetic torque coupling device of claim 3, wherein the first distal end clutch surface or the second distal end clutch surface further comprises a friction ring secured thereto for frictionally, non-rotatably coupling with the other distal end clutch surface in the lockup mode.

5. The hydrokinetic torque coupling device of claim 1, further comprising:
   a casing comprising the impeller shell and a casing shell interconnected to and non-rotatable relative to the impeller shell;
   an output hub;
   a damper assembly interconnecting the turbine-piston to the output hub; and
   a drive member interconnecting the turbine-piston shell to the damper assembly, wherein the drive member is affixed to the substantially toroidal portion of the turbine-piston shell of the turbine-piston so that the folded-over portion is spaced from the drive member.

6. The hydrokinetic torque coupling device of claim 5, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

7. The hydrokinetic torque coupling device of claim 5, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

* * * * *